United States Patent
Zhu

(10) Patent No.: US 9,442,907 B2
(45) Date of Patent: Sep. 13, 2016

(54) DISASTER RECOVERY METHOD AND APPARATUS USED IN DOCUMENT EDITING AND STORAGE MEDIUM

(71) Applicants: Peking University Founder Group Co., Ltd., Beijing (CN); Beijing Founder Electronics Co., Ltd., Beijing (CN)

(72) Inventor: Xuewu Zhu, Beijing (CN)

(73) Assignees: Peking University Founder Group Co., Ltd., Beijing (CN); Beijing Founder Electronics Co., Ltd., Beijing (CN)

( * ) Notice: Subject to any disclaimer, the term of this patent is extended or adjusted under 35 U.S.C. 154(b) by 175 days.

(21) Appl. No.: 14/093,944

(22) Filed: Dec. 2, 2013

(65) Prior Publication Data

US 2014/0359420 A1 Dec. 4, 2014

(30) Foreign Application Priority Data

Jun. 4, 2013 (CN) .......................... 2013 1 0219223

(51) Int. Cl.
*G06F 17/00* (2006.01)
*G06F 17/22* (2006.01)
*G06F 17/24* (2006.01)

(52) U.S. Cl.
CPC ........... *G06F 17/2288* (2013.01); *G06F 17/24* (2013.01)

(58) Field of Classification Search
CPC ..................... G06F 17/2288; G06F 17/30165
See application file for complete search history.

(56) References Cited

U.S. PATENT DOCUMENTS

| 5,361,134 | A  | * | 11/1994 | Hu ......................... G06F 17/21 358/296 |
| 5,459,579 | A  | * | 10/1995 | Hu et al. ...................... 358/296 |
| 6,067,551 | A  | * | 5/2000  | Brown .................. G06Q 10/10 |
| 6,411,966 | B1 | * | 6/2002  | Kwan ............... H04L 29/12066 |
| 7,167,860 | B1 | * | 1/2007  | Black ..................... G06Q 30/04 705/35 |
| 2002/0078174 | A1 | * | 6/2002 | Sim ................... G06F 17/30194 709/219 |
| 2003/0146977 | A1 | * | 8/2003 | Vale ................... H04N 1/00204 348/207.1 |

(Continued)

*Primary Examiner* — Laurie Ries
(74) *Attorney, Agent, or Firm* — Leydig, Voit & Mayer, Ltd.

(57) ABSTRACT

The present invention provides a disaster recovery method used in document editing, comprising: storing the document to a local copy directory to form a local copy while editing the document; submitting the document to a server when editing of the document is finished; if the document is submitted successfully, deleting the local copy; if the document is not submitted successfully, recovering the document by using the local copy. The present invention also provides an apparatus, comprising: a backup module, used to store a document to a local copy directory to form a local copy while editing the document; a submitting module, used to submit the document to a server when editing of the document is finished; a deleting module, used to delete the local copy if the document is submitted successfully; a recovery module, used to recover the document using the local copy if the document is not submitted successfully.

6 Claims, 3 Drawing Sheets

(56) References Cited

U.S. PATENT DOCUMENTS

| | | | |
|---|---|---|---|
| 2004/0049345 A1* | 3/2004 | McDonough | G06Q 10/10 702/12 |
| 2004/0229199 A1* | 11/2004 | Ashley | G09B 7/00 434/323 |
| 2006/0200755 A1* | 9/2006 | Melmon | H04L 67/1095 715/234 |
| 2007/0198657 A1* | 8/2007 | Saliba et al. | 709/219 |
| 2008/0034018 A1* | 2/2008 | Cisler | G06F 3/04847 |
| 2008/0109448 A1* | 5/2008 | Aboel-Nil | G06Q 10/107 |
| 2009/0319532 A1* | 12/2009 | Akelbein | G06F 17/30221 |
| 2010/0036896 A1* | 2/2010 | Nakagawa | G06F 11/1456 707/E17.009 |
| 2011/0161723 A1* | 6/2011 | Taleck | G06F 17/30156 714/4.11 |
| 2012/0005468 A1* | 1/2012 | Yu | G06F 11/1417 713/2 |
| 2013/0054550 A1* | 2/2013 | Bolohan | G06F 17/30902 707/705 |
| 2013/0226891 A1* | 8/2013 | Markus | G06F 17/30356 707/703 |
| 2014/0143202 A1* | 5/2014 | Rekula | G06F 17/30 707/610 |
| 2014/0172783 A1* | 6/2014 | Suzuki | G06F 17/30356 707/609 |
| 2014/0181579 A1* | 6/2014 | Whitehead | G06F 8/63 |
| 2014/0201145 A1* | 7/2014 | Dorman | G06F 17/30289 714/15 |
| | | | G06F 17/30575 707/634 |

* cited by examiner

DISASTER RECOVERY METHOD AND APPARATUS USED IN DOCUMENT EDITING AND STORAGE MEDIUM

CROSS-REFERENCE TO RELATED APPLICATIONS

This application claims priority to Chinese Application No. CN 201310219223.2, filed on Jun. 4, 2013, which is incorporated by reference herein in its entirety.

TECHNICAL FIELD

The present invention relates to the information technology field, and more specifically to a disaster recovery method and an apparatus used in document editing and a storage medium.

BACKGROUND

In the existing network information system, the data edited by a user is usually stored in a server at regular intervals to reduce the loss in the case of system abnormality. Because the system needs to store the data in the server through a network environment, the storing speed may be slow and the data may fail to store.

SUMMARY

The present invention is intended to provide a disaster recovery method and an apparatus used in document editing and a storage medium, to solve the aforesaid problem.

In the embodiment of the present invention, a disaster recovery method used in document editing of the document is provided, comprising: storing a document to a local copy directory to form a local copy while editing the document; submitting the document to a server when the editing of the document is finished; if the document is submitted successfully, deleting the local copy; if the document is not submitted successfully, recovering the document by using the local copy.

In the embodiment of the present invention, a disaster recovery apparatus used in document editing of the document is provided, comprising: a backup module used to store the document to a local copy directory to form a local copy while editing the document; a submitting module used to submit the document to a server when the editing of the document is finished; a deleting module used to delete the local copy if the document is submitted successfully; a recovery module used to recover the document by using the local copy if the document is not submitted successfully.

In the embodiment of the present invention, a computer program is provided to execute aforesaid disaster recovery method used in document editing.

In the embodiment of the present invention, a storage medium is provided for storing a computer program for implementing the disaster recovery method used in document editing.

In the disaster recovery method and apparatus used in document editing according to above-mentioned embodiment of the present invention, the data is stored locally temporarily, which overcomes the problem that network real-time backup is relatively slow and easily to fail, and achieves fast and safe backup a document for disaster recovery.

BRIEF DESCRIPTION OF THE DRAWINGS

The drawings which constitute a part of this application, including the schematic embodiment of the present invention and its illustration are used to provide further understanding of the present invention. However, the drawings should not be used to limit the present invention to the specific embodiment therein. In the drawings.

DETAILED DESCRIPTION

In the following, the present invention will be illustrated in details with reference to the appended drawings and with respect to the embodiments.

Figure 1:
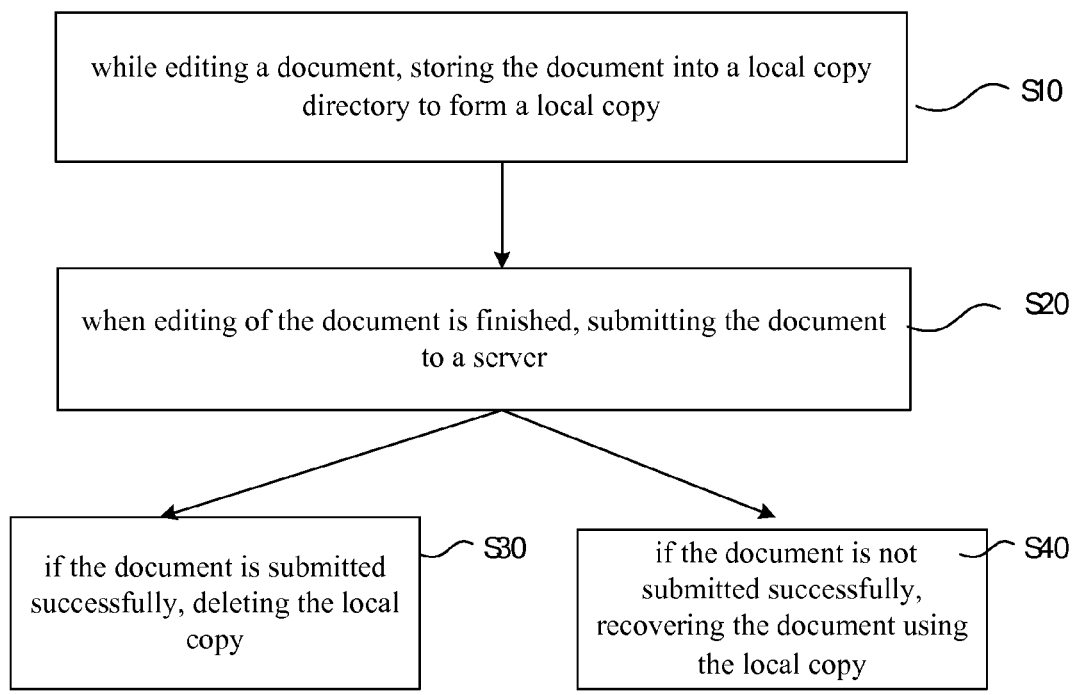
FIG. 1 shows a flow chart of a disaster recovery method used in document editing according to one embodiment of the present invention.

FIG. 1 shows a flow chart of disaster recovery method used in document editing according to the embodiment of the present invention, comprising:

Step S10 which stores a document to a local copy directory to form a local copy while editing the document;

Step S20 which submits the document to a server when editing of the document is finished;

Step S30 which deletes the local copy if the document is submitted successfully;

Step S40 which recovers the document using the local copy if the document is not submitted successfully.

In the prior art, storing data to a server continually will cause a user to wait for the storing processes of the system frequently. Even using a multithreading technology, the restriction of the network resource would also cause a pause of the whole system. When an enterprise network information system is used by multiple users at the same time, the users storing data to the server frequently will cause a very large pressure on the server, which therefore results in problems such as insufficient resources, collapsing of the server, etc. Because the present method stores data in the local directory temporarily, it overcomes the problem that network real-time backup is relatively slow and easy to fail, and permits fast and safe backup of a document for disaster recovery.

Preferably, while editing a document, the document is stored locally at regular intervals or according to the user's instructions. For example, when a user is using an edit function of the system, the system stores the data input by the user locally at regular intervals. The time interval and a directory for locally storing the document can be set in options. The time interval may be a minute or other time unit. When the time unit is set as 0 minute, data is not stored automatically. The stored data may include text content, an inserted picture, an audio or video, and an attachment input by the user. The system will automatically create a directory hierarchy of "/user name of the network information system/document ID" in a local copy directory set by the user. The user name of the network information system distinguishes the data stored by multiple users that log into the system in a same computer. The document ID corresponds to an ID of the system document. All the data relating to this document are stored in this directory. The user can also store the data to a copy directory by manually clicking the button of "stored locally," which permits the user to flexibly and selectively control the function of storing a document locally.

Preferably, when editing of the document is finished, the users do not submit the document to the server, and delete the local copy. If the document is not submitted, it means no recovery is needed; and therefore the local copy is deleted, which can reduce the rubbish.

Preferably, Step S40 comprises: when the document is started to be edited, reminding that it failed to submit the document to the server; and reminding the following operations are allowed: processing the local copy immediately; processing the local copy later; and abandoning the local copy.

Preferably, Step S40 further comprises: if the user selects to process the local copy immediately, loading the local copy as the document to be edited; if the user selects to process the local copy later, ignoring the local copy, opening a new document for editing; and if the user selects to abandon the local copy, deleting the local copy and opening a new document for editing.

Figure 2:
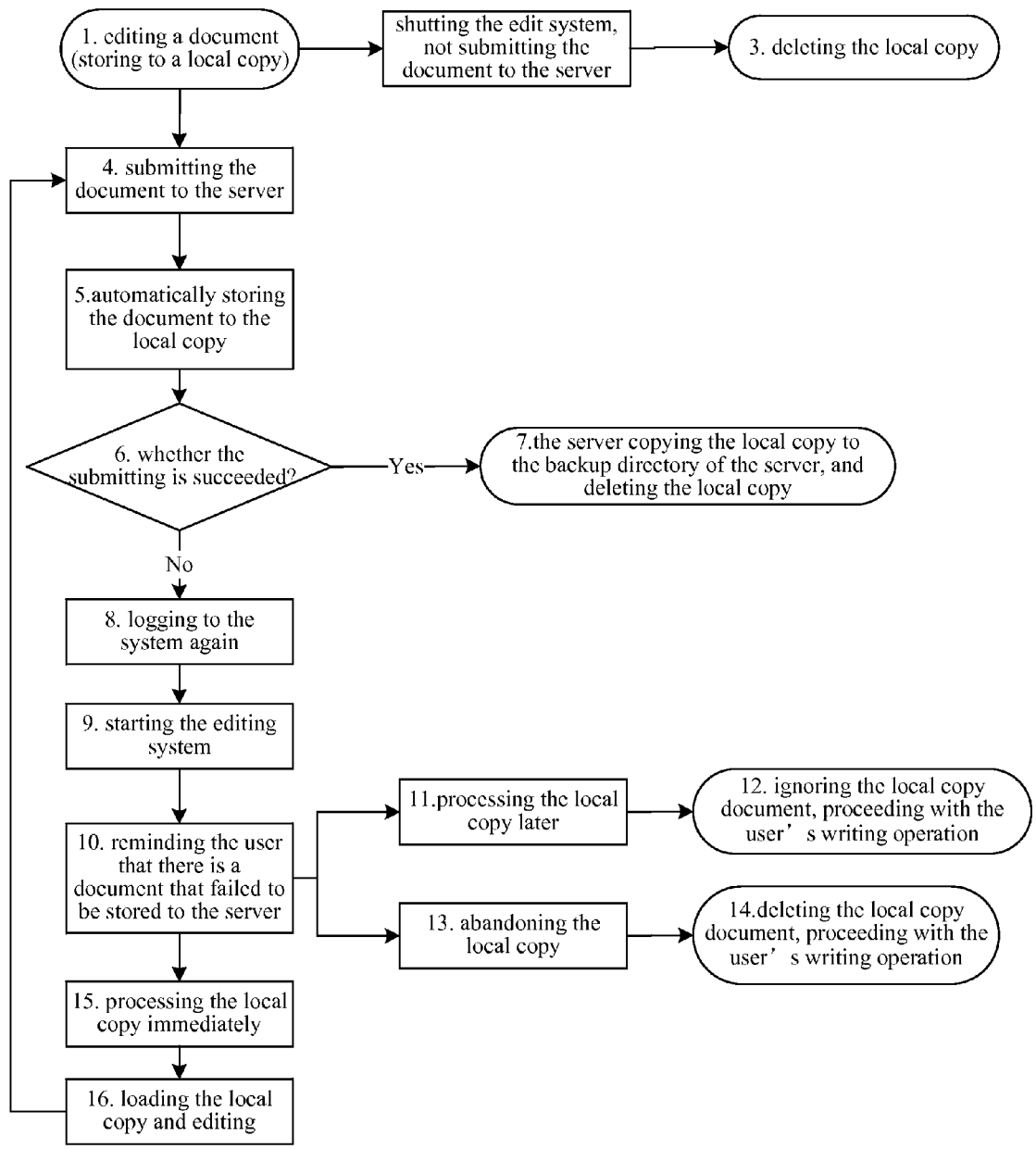
FIG. 2 shows a flow chart of a disaster recovery method used in document editing according to a preferred embodiment of the present invention.

FIG. 2 shows the flow chart of disaster recovery method used in document editing according to the preferred embodiment of the present invention. The steps are described as follows:

1: starting edit software of the network information system to edit a document, and storing the current edited document to a local copy directory at regular intervals during editing procedure to form a local copy.

2: while closing the edit system, the user confirms that the document should not be submitted to the server.

3: deleting the local copy.

4: submitting the document to the server if the user confirms that the document should be submitted.

5: storing the current document locally to form the local copy at this point.

6: if the document is submitted successfully, the server copies the local copy (or the document) to the backup directory of the server. The server also consists of a backup directory of the local documents, which can also be set in the options by the user. It functions to backup the documents that have been stored to the server successfully by the user, which is the copy of each document that stored successfully by the user at the latest time. This data can ensure the user can find the data edited by him/her if the server is subjected to unrecoverable abnormalities. The system can automatically create a directory hierarchy of "/user name of the network information system/month/day/document ID" under the backup directory set by the user. The function of the user name of the network information system and the document ID is the same with that of the local backup directory. A directory hierarchy of year and month is created according to the time of storing the document, so as to differentiate between multiple data files being stored and to assist in arranging them.

8: while the user is using the edit function, if abnormal situation occurs (such as the hardware of the network information system server is abnormal, the database is abnormal, the program of the network information system is abnormal etc.), it results in system failed to store the data to the server, or if the user's local machine is abnormal, it results in the network information system exits directly.

9: in these cases, since the data that is edited/modified by the user has been stored to the local copy directory, the user can start the edit system after the system is normal, enter the edit function to create or modify a new document.

10: at this point, the system can perform the following actions: automatically scanning the local copy directory, finding the directory of the user name that is currently logged into the network information system. If a directory of the current user name is found, finding out whether a subdirectory of the document ID exists in the directory of user name. If the subdirectory of the document ID exists, reminding the user that there is a document failed to be stored to the server, whether process it.

11: the user can select "process later."

12: the system will ignore the document that is stored locally and continue a new writing operation of the user; the same reminder will appear when the user enters to the edit function field again.

13: the user can also select "abandon to process."

14: the system will delete the document locally stored and continue a new writing operation for the user.

15: the user selects "process immediately."

16: the system will load the document that is stored in the local copy directory and ignore the current operation of the user.

After the system loaded the document locally stored, the user can continue the job before the abnormality, and store the data to the server. Because the directory of local document ID is created according to the system document ID, the data can be accurately stored to the location corresponding to the service.

After the system stores the data to the server successfully, the system will copy the data in the local copy directory to the backup directory, and then delete the data in the local copy directory.

In addition to deleting the data in the local copy directory when the data is stored to the server successfully, when the user shuts the edit function field normally and selects to do not store the document to the server, the system will also delete the data in the local copy directory. Because, in this case, the user voluntarily abandons to store the document to the server, rather than not able to store the document to the server when an abnormality occurs.

The user can load the data in the backup directory by using an open function of the edit function field. Since this directory has a directory hierarchy of user name, year, and month, it is easier to find a desired document for the user. If the user wants to clear the backup data stored for a long time, he/she can conveniently delete the data according to year and month.

Figure 3:
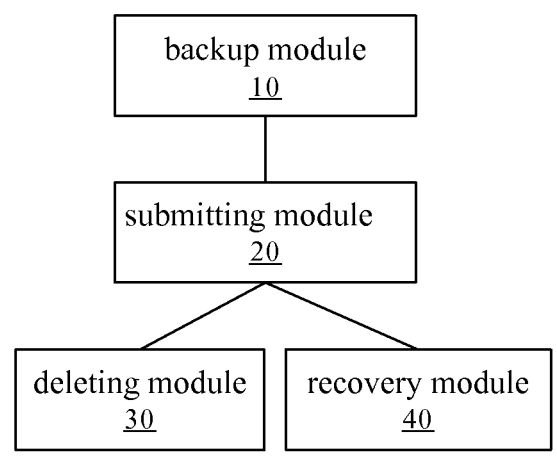
FIG. 3 shows a schematic diagram of a disaster recovery apparatus used in document editing according to one embodiment of the present invention.

FIG. 3 shows the schematic diagram of disaster recovery apparatus used in document editing according to the embodiment of the present invention, comprising:

A backup module 10, used to store a document to a local copy directory to form a local copy while editing document;

A submitting module 20, used to submit the document to the server when editing of the document is finished;

A deleting module 30, used to delete the local copy if the document is submitted successfully;

A recovery module 40, used to recover the document using the local copy if the document is not submitted successfully.

The apparatus can quickly and safely backup a document for disaster recovery.

Preferably, the recovery module comprises: a reminding module, used to remind the user that submitting the document to the server failed when the document is started to be edit, and the following operations are allowed: processing the local copy immediately; processing the local copy later; abandoning the local copy.

Preferably, the recovery module further comprises: an immediate processing module, used to load the local copy as the document to be edited if the user selects to process the local copy immediately; a later processing module, used to ignore the local copy and open a new document for editing if the user selects to process the local copy later; an abandon module, used to delete the local copy and open a new document for editing if the user selects to abandon the local copy.

The present invention solves the problem for an enterprise network information system in the aspect of storing efficiency and storing success rate of an edit function, decreases a waiting time in editing procedure, reducing the server stress, and ensuring the content that was edited by a user will not be lost.

Obviously, those skilled in the art should understand that each module or each step of the present invention can be realized by using general-purpose computing apparatus, which can be concentrated in a single computing apparatus or distributed on the network that is composed by a plurality of computing devices, and optionally, they can be achieved by using computer program codes that executable by a computing apparatus, thus it is possible to store them in a storage medium and be executed by the computing device, or it is possible to make them as an integrated circuit module respectively, or make their multiple modules as a single integrated circuit module to perform multiple steps thereof. Thus, the present invention is not limited to any specific combination of hardware or software.

The foregoing is only preferred embodiments of the present invention, it is not intended to limit the invention, and the present invention may have various changes and variations to those skilled in the art. Any modification, equivalent replacement, improvement, etc. that within the spirit and principle of the present invention, should be included in the scope of protection of the present invention.

What is claimed is:

1. A disaster recovery apparatus used in document editing, comprising:
   at least one processor; and
   at least one non-transitory computer-readable memory having computer program code for one or more programs stored thereon, wherein the computer program code, when executed by the at least one processor, causes the apparatus to perform at least the following:
   storing a document to a local copy directory to form a local copy while the document is being edited;
   submitting the document to a server through a network when the editing of the document is finished;
   deleting the local copy if the document is submitted successfully; and
   recovering the document by using the local copy if the document is not submitted successfully;
   wherein execution of the computer program code further causes the apparatus to perform the following in the event that the document was not submitted to the server successfully:
   providing a reminder that submission of the document to the server failed when editing of the document is started; and
   allowing the following operations: processing the local copy immediately; processing the local copy later; and abandoning the local copy.

2. The apparatus according to claim 1, wherein execution of the computer program code further causes the apparatus to perform the following
   loading the local copy as a document to be edited if the user selects to process the local copy immediately;
   ignoring the local copy and opening a new document for editing if the user selects to process the local copy later; and
   deleting the local copy and opening a new document for editing if the user selects to abandon the local copy.

3. A non-transitory computer-readable storage medium having processor-executable instructions stored thereon for a disaster recovery method used in document editing, the processor-executable instructions, when executed by a processor, facilitating performance of the following steps:
   storing a document to a local copy directory to form a local copy while the document is being edited;
   submitting the document to a server when the editing of the document is finished;
   if the document is submitted successfully, deleting the local copy; and
   if the document is not submitted successfully, recovering the document by using the local copy;
   wherein recovering the document by using the local copy further comprises:
   when editing of the document is started, providing a reminder that submission of the document to the server failed; and
   providing a reminder that the following operations are allowed: processing the local copy immediately; processing the local copy later; and abandoning the local copy.

4. The non-transitory computer-readable storage medium according to claim 3, wherein the processor-executable instructions, when executed, further facilitate performance of the following steps:
   if a user selects to process the local copy immediately, loading the local copy as the document to be edited.

5. The non-transitory computer-readable storage medium according to claim 3, wherein the processor-executable instructions, when executed, further facilitate performance of the following steps:
   if a user selects to process the local copy later, ignoring the local copy and opening a new document for editing.

6. The non-transitory computer-readable storage medium according to claim 3, wherein the processor-executable instructions, when executed, further facilitate performance of the following steps:
   if a user selects to abandon the local copy, deleting the local copy and opening a new document for editing.

* * * * *